Sept. 28, 1965 KAZUO ISHIKAWA ETAL 3,208,287

MAGNETIC ESCAPEMENT

Filed Oct. 12, 1962 3 Sheets-Sheet 1

MAGNETIC ESCAPEMENT

Filed Oct. 12, 1962 3 Sheets-Sheet 2

Sept. 28, 1965 KAZUO ISHIKAWA ETAL 3,208,287

MAGNETIC ESCAPEMENT

Filed Oct. 12, 1962 3 Sheets-Sheet 3

United States Patent Office 3,208,287
Patented Sept. 28, 1965

3,208,287
MAGNETIC ESCAPEMENT

Kazuo Ishikawa, Tokyo, and Koichi Iwaki, Gyoda-shi, Saitama-ken, Japan, assignors to Jeco Company, Limited, Tokyo, Japan, a corporation of Japan Filed Oct. 12, 1962, Ser. No. 230,182
Claims priority, application Japan, Oct. 21, 1961, 36/52,154; Oct. 26, 1961, 36/38,410
8 Claims. (Cl. 74—1.5)

This invention relates to improvements in a magnetic escapement mechanism.

The magnetic escapement mechanism is already known, for example, due to British Patents Nos. 660,581 and 838,430. In a magnetic escapement mechanism, a permanent magnet is secured to the forward end of a resilient material fixed at the other end to a supporter to form an oscillator oscillating around the fixing point of the resilient material as a fulcrum, and the undulating magnetic track of an escape wheel such as a rotary disk is rotatably set between the N and S poles of the said permanent magnet.

The magnetic escapement mechanisms proposed heretofore have defects known as "speeding up" and "fluctuation." The "speeding up" means that, in FIGURE 10, in case days are plotted on the abscissa and rates are plotted on the ordinate to show the characteristics of the magnetic escapement, as represented by the curve A', the rates (time keeping) will vary every day with the lapse of time and will gradually become higher as a whole. The "fluctuation" means the fluctuation of the daily rates as represented by D on the curve A' in FIGURE 10.

The reason why the magnetic escapement mechanisms previously proposed have the defects known as "speeding up" and "fluctuation" is considered to be that the relative difference between the oscillating energy kept by the oscillator used and the energy given and received by magnetic attraction between the magnetic poles of the magnet, an element of the oscillator, and the undulating magnetic track of the escape wheel is not large enough and that therefore the oscillatory motion of the oscillator will be so greatly disturbed by the torque fluctuation appearing on the escape wheel or the like that, the oscillating frequency will be biased and "the speeding up" and "fluctuation" will be caused. Thus, if the relative difference between both energies is made large, such defects will be able to be eliminated. However, in the use of the conventional "Balance Reed" as the oscillator, its sharpness of resonance is so low that the relative difference between both energies has not been able to be made large. Such sharpness of resonance corresponds to the characteristics of a resonant circuit in an electric circuit.

The above mentioned sharpness of resonance is represented by the curve A in FIGURE 11 in which the abscissa represents the frequency *n* of the driving force and the ordinate represents the oscillator's amplitude Y.

In the conventional magnetic escapement mechanism using a "Balanced Reed" of a low sharpness of resonance (the value of Q about 100 to 200), the oscillating energy of the "Balanced Reed" leaking from the supporting part of the "Balance Reed" is so large that the ground plate to which the supporting part of the "Balance Reed" is attached, the supporting part and all the members in contact with the ground plate will integrally form an oscillation system. Therefore, the frequency of the "Balance Reed" will not be determined by only the physical conditions of the "Balance Reed" itself as, for example, the Young's modulus of the resiliency of the "Balance Reed" and the mass of the magnet, but will also be influenced by the physical conditions of all the members forming the oscillation system.

The present invention has been made to eliminate the above mentioned defects and is to suggest using a tuning fork instead of the conventional "Balance Reed" in a magnetic escapement.

A main object of the present invention is to provide a magnetic escapement mechanism which is very high in precision by synchronizing an escape wheel with the stable oscillatory motion of a tuning fork.

The present invention shall now be explained with reference to the accompanying drawings.

Figure 1:
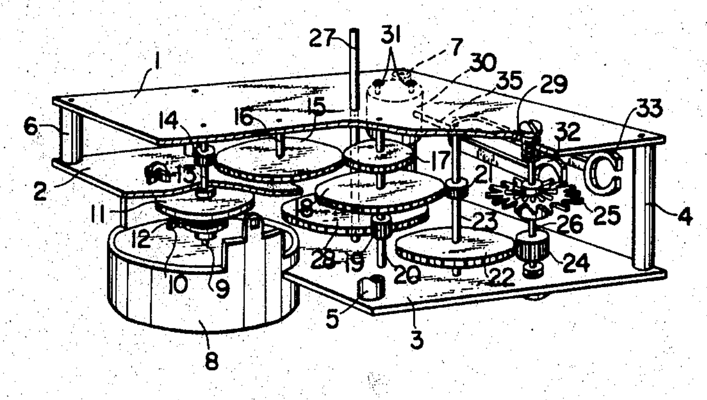
FIGURE 1 is a perspective view of an embodiment of the magnetic escapement mechanism of the present invention.
Figure 2:
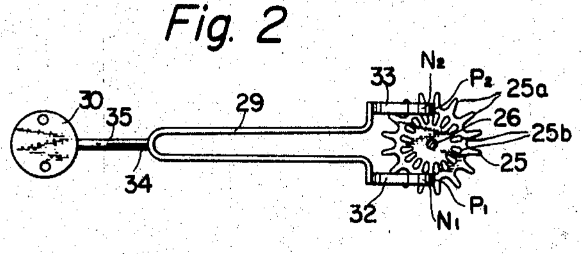
FIGURE 2 is a plan view of another embodiment of the magnetic escapement mechanism.
Figure 3:
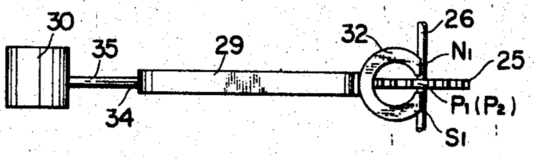
FIGURE 3 is a side view of the same.

In FIGURE 1, 1, 2 and 3 are ground plates. 4, 5, 6 and 7 are pillars to fix the said ground plate. 8 is a direct current motor.

9 is a rotary shaft for the said motor. 10 is a spring attached to the said rotary shaft. 11 is a rotary disk. 12 is a pin attached to the said rotary disk and engaged with the free end of the spring 10. 13 is a shaft for the rotary disk. 14 is a gear. 15 is a gear fixed to a shaft 16. 17, 18 and 19 are gears fixed to the shaft 20. 21 and 22 are gears fixed to a shaft 23. 24 is a gear. 25 is an escape wheel made of a magnetic flux conducting material and fixed to a shaft 26. The escape wheel 25 has a plurality of radial projections **25*a* around its periphery and a plurality of corresponding elongated apertures 25*b* alined with the projections 25*a* so as to form the conventional undulating magnetic track. 28 is a gear fixed to a shaft 27. 29 is a tuning fork. 35 is a pillar to fix the tuning fork 29 to a supporter 30 fixed to the ground plate 1 with screws 31. 32 and 33 are magnets secured as opposed to each other to both forked ends of the tuning fork. The said magnets are in the form of rings or frames cut in one place of the magnetic circuit to have magnetic poles in the form like a slit. The escape wheel 25 is interposed between the N and S poles of one 32 of the said magnets. In this case, the other magnet 33 not combined with an undulating part of the escape wheel 25 can be replaced with any other weight that can be a counterweight for the magnet 32**.

The operation of the magnetic escapement mechanism of the present invention shall now be explained. The rotation of the direct current motor 8 will be transmitted to the rotary disk 11 through the spring 10 as a shock absorber and then to the escape wheel 25 through the gears 14, 15, 17, 18, 21, 22 and 24. The escape wheel is so provided as to rotate with the undulating magnetic track interposed between the N and S poles of the magnet 32 secured to the forked end of the tuning fork, and is therefore magnetically combined with the magnet 32 and rotates at a constant speed as in a known magnetic escapement device. This constant rotation will be transmitted to the shaft 27 through the gears 19 and 28.

The sharpness of resonance of the tuning fork used as an oscillator in the present invention is much greater than the sharpness of resonance of a conventional oscillator employing a "Balance Reed," for example, the value of Q of the tuning fork being about 1000 to 2500. (See the curve B in FIGURE 11.)

Figure 11:
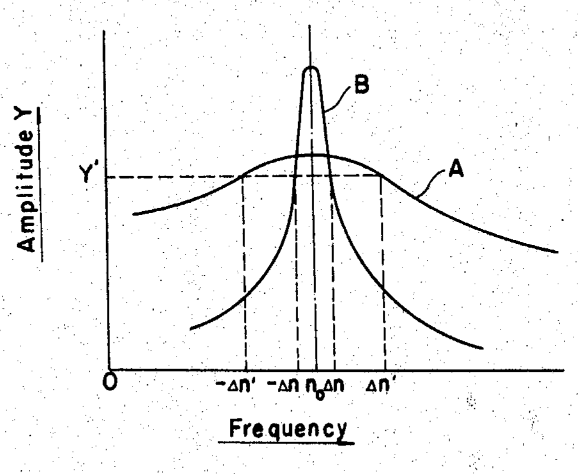
FIGURE 11 is a graph showing the relation between the sharpness of resonance and the frequency bias of the "Balance Reed" and the tuning fork.

FIGURE 11 shows the sharpness of resonance of the "Balance Reed" used in a conventional magnetic escapement mechanism and that of the tuning fork in the present invention as driven by the same magnitude of force. The curve A therein represents the sharpness of resonance of the conventional magnetic escapement mechanism and the curve B represents that of the present invention. In FIGURE 11, the ordinate represents the amplitude Y and the abscissa represents the frequency of the driving force. If, in order to synchronize the escape wheel, each of the two type oscillators discharges the same amount of the oscillating energy kept by it and its amplitude is reduced to Y', the natural frequency of the conventional oscillator will be biased from $n_0$ to $n_0 + \Delta n'$ or $n_0 - \Delta n'$. That is to say, in case the oscillator brakes the advancing escape wheel the frequency bias will be $\Delta n'$. On the contrary, in case the escape wheel is to be rotated by the oscillator driven by some electro magnetic devices, the frequency bias will be $-\Delta n'$.

However, the frequency bias of the tuning fork will be $\Delta n$ which is smaller than the frequency bias $\Delta n'$ of the conventional "Balance Reed." Therefore, the fluctuation of the rates will be smaller.

In FIGURE 1, only the magnet 32 of the magnets 32 and 33 secured to the forked ends of the tuning fork 29 is magnetically combined with the escape wheel 25. However, the characteristics can be further improved by magnetically combining both magnets 32 and 33 with the escape wheel 25. Only the coupled part of the tuning fork and escape wheel is illustrated in FIGURES 2 and 3. However, as shown in the drawings, the escape wheel 25 is rotatably inserted between the respective N and S poles of the magnets 32 and 33 secured to both forked ends of the tuning fork 29 so that both magnetically combining points may be symmetrical with respect to the center of the escape wheel.

Figure 8:
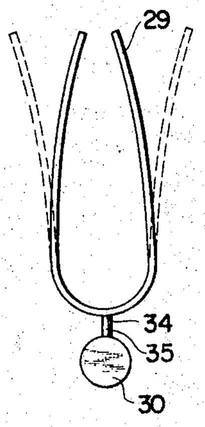
FIGURES 8 and 9 are explanatory views showing the oscillating states of the tuning fork.
Figure 9:
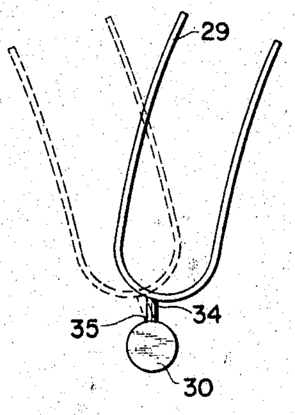

In case only the magnet 32 secured to the forked end of the tuning fork is magnetically combined with the escape wheel 25 as shown in FIGURE 1, the tuning fork will oscillate around its supporting point 34 as a fulcrum. In such case, the oscillator will form a kind of a cantilever. Therefore, in case the tuning fork is used as such mechanical oscillating element, there will be caused such motion which is not the normal oscillatory motion of the tuning fork as is shown in FIGURE 9, that is to say, such complicated oscillatory motion as results from a combination of the oscillatory motion of the fork 29 as of a cantilever, having the supporting point 34 of the tuning fork 29 as a fulcrum, and the normal oscillatory motion of the tuning fork 29 as is shown in FIGURE 8. Consequently, the safety of the operation will be impaired in some cases. This defect has been eliminated by such formation as is shown in FIGURES 2 and 3.

Figure 10:
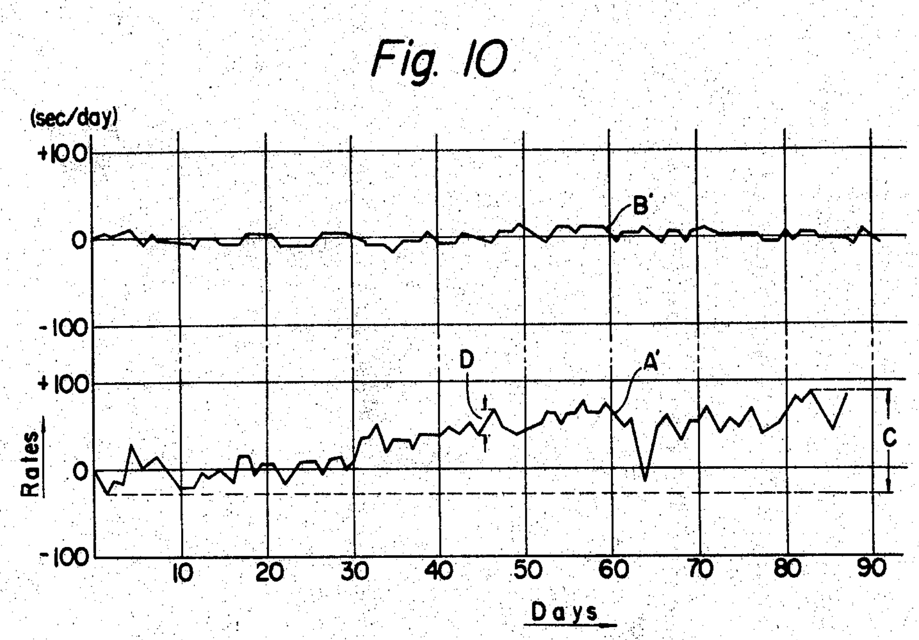
FIGURE 10 is a graph comparatively showing the "speeding up" and "fluctuation" of a conventional magnetic escapement mechanism and those of the magnetic escapement mechanism according to the present invention.

The escape wheel 25 is so provided as to be freely rotatable between the poles $N_1$ and $S_1$ and $N_2$ and $S_2$ of the magnets 32 and 33, respectively. The tuning fork and the escape wheel are magnetically combined with each other by magnetic fluxes between the magnetic poles $N_1$ and $S_1$ and $N_2$ and $S_2$. Therefore, the tuning fork 29 as the oscillating element and the escape wheel 25 will be combined with each other at two points $P_1$ and $P_2$ (see FIGURES 2 and 3). Therefore, the forces received by the magnets 32 and 33 from the escape wheel will so act as to make the tuning fork produce a normal oscillation and to always cancel each other. Thus the force received by the rotary shaft 26 will also reduce and the wear of the shaft can be prevented. Further, the oscillating energy leaking from the supporting point 34 of the tuning fork 29 to the body of a clock or the like is so much smaller than the energy leaking in the conventional magnetic escapement device using the "Balance Reed" oscillator, that there will be substantially no variation of the frequency by the influence of the loosening or the like of any part of the body of the clock with the lapse of time. Therefore, "speeding up" and "fluctuation" can be solved without the need of enlarging the mass of the supporting pillar 30 in order to make the mechanical impedance of the supporting portion infinitely large. This is evident from experiments and can be easily understood by comparing the variations of the rates of both escapement mechanisms represented by the curves A' for the conventional product and B' for the product of the present invention in FIGURE 10.

Figure 4:
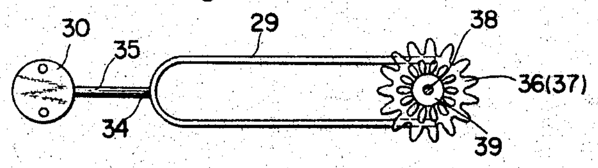
FIGURE 4 is a plan view of a still another embodiment wherein a magnet is set between two escape wheels with which a tuning fork is magnetically combined.
Figure 5:
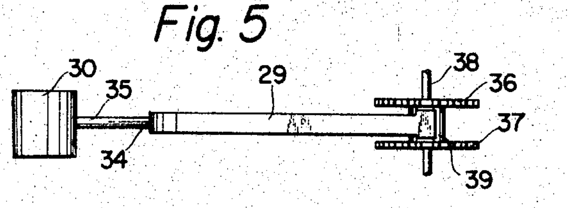
FIGURE 5 is a side view of the same.

FIGURES 4 and 5 show another embodiment of fitting a magnet. 29 is a tuning fork. 30 is a supporting pillar. 36 and 37 are escape wheels secured to a shaft 38. 39 is a magnet held between the said escape wheels 36 and 37. Due to the required frequency of the tuning fork, no large magnet can be attached to the forked end of the tuning fork. However, a magnet larger and stronger than in the case of attaching it to the tuning fork can be used by holding it between the escape wheels.

Figure 6:
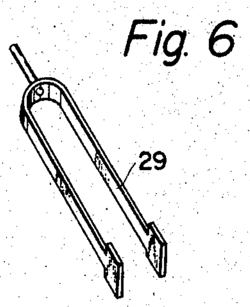
FIGURES 6 and 7 are perspective views of other respective embodiments of the tuning fork.
Figure 7:
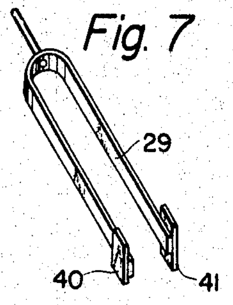

Further, by making the forked ends of the tuning fork as shown in FIGURES 6 and 7, the magnetic combination with the escape wheel can be improved. Also, if the structure shown in FIGURE 7 is adopted, it will be easy to determine the frequency at any desired value by properly selecting the dimensions of contact pieces 40 and 41.

Since the Q of the tuning fork employed in the present invention is much higher than that of the conventional balance reed, the efficiency will be higher and therefore the driving energy required to oscillate the tuning fork at any desired amplitude may be relatively small. In order to maintain the oscillation, only a load energy and loss energy need be fed to the device. In the conventional timepiece mechanisms of this kind, the loss energy occupies the greater part of the fed energy, but when the tuning fork is used in accordance with this invention, such loss energy is considerably smaller than in the conventional balance reed devices.

For the above mentioned reasons, even if a magnetic connecting means which is not so powerful as a mechanical connecting means is used for the connection of the tuning fork with the rotor plate, a comparatively powerful tuning fork, such as a fork having a high frequency of 200–400 cycles per second for example, may still be excited. Moreover, the timepiece provided by this invention operates stably against any external shock, is portable, and has a small position error.

Further, according to the present invention, as there is used a tuning fork whose Q and frequency are much higher than of any conventional balance wheel oscillator and balance reed, the oscillation energy kept by the tuning fork at the time of the operation will be well larger than the load energy and loss energy. Therefore, there can be obtained a timepiece whose accuracy is much higher than of a timepiece in which the conventional oscillator is used.

Further, the most preferable embodiment of the present invention is shown in FIGURE 2. According to it, as both tines of the tuning fork are integrally connected from the viewpoint of the energy and the tuning fork has two magnetic connecting parts to transmit said load energy and loss energy, not only a more powerful tuning fork can be used but also there can be obtained a timepiece which operates stably and is high accuracy.

In the above description, there has been chiefly explained a case wherein the escape wheel is rotated and is magnetically combined with the magnet secured to the forked end of the tuning fork. (This is called a normal drive in this invention.) On the contrary, the tuning fork can be oscillated at a fixed frequency, the magnet secured to the forked end of the tuning fork and the escape wheel can be magnetically combined with each other and the escape wheel can be rotated at a fixed rotating speed. (This is called a reverse drive in this invention.)

Further, in FIGURES 4 and 5 as the magnet is held between the escape wheel, both normal and reverse drives can be used by oscillating the tuning fork.

As described above, the present invention has advantages in that the defects of the conventional magnetic escapement can be completely eliminated, that the escape wheel can be synchronized with the stable oscillatory motion of the tuning fork and that magnetic escapement very high in precision can be obtained with a simple mechanism.

What is claimed is:

1. A magnetic escapement mechanism comprising the combination of a pair of concentric, rotatable escape wheels spaced apart from each other and made of a magnetic flux conducting material, a rigid mounting member, a tuning fork having a base portion rigidly secured to said mounting member and a pair of tines projecting from said base portion into the space between said escape wheels, means for magnetically coupling said tines to said escape wheels whereby the rotation of said escape wheel is synchronized with the oscillation of said tines.

2. A magnetic escapement mechanism as defined in claim 1 wherein the tines of the tuning fork are magnetically coupled to the escape wheels by means of a magnet centrally mounted between the escape wheels and between the tines of the tuning fork.

3. A magnetic escapement mechanism comprising the combination of a rigid mounting member, a tuning fork having a base portion rigidly secured to said mounting member and a pair of tines projecting from said base portion, a pair of magnets each of which is mounted on one of said tines, and a rotatable escape wheel made of a magnetic flux conducting material shaped to provide an undulating magnetic track extending around said escape wheel, said escape wheel being disposed between said magnets for magnetically coupling the tuning fork to the escape wheel at two spaced points whereby the rotation of said escape wheel is synchronized with the oscillation of the tuning fork.

4. A magnetic escapement mechanism comprising the combination of a rigid mounting member, a tuning fork having a base portion rigidly secured to said mounting member and a pair of tines projecting from said base portion, a pair of magnets each of which is mounted on one of said tines, and a rotatable escape wheel made of a magnetic flux conducting material and disposed between said magnets for magnetically coupling the tuning fork to the escape wheel at two spaced points, said escape wheel being adapted to modify the reluctance between the poles of each of said magnets in accordance with the predetermined frequency of said tuning fork whereby the rotation of said escape wheel is synchronized with the oscillation of the tuning fork.

5. A magnetic escapement mechanism comprising the combination of a rigid mounting member, a tuning fork having a base portion rigidly secured to said mounting member and a pair of tines projecting from said base portion, a pair of magnets each of which is mounted on one of said tines, and a rotatable escape wheel made of a magnetic flux conducting material shaped to form a plurality of radially extending, circumferentially spaced magnetic teeth, said escape wheel being mounted so that said magnetic teeth pass between the magnetic poles of both of said magnets so as to magnetically couple said tuning fork to the escape wheel at two spaced points whereby the rotation of said escape wheel is synchronized with the oscillation of the tuning fork.

6. A magnetic escapement mechanism comprising the combination of a rigid mounting member, a tuning fork having a base portion rigidly secured to said mounting member and having a permanent magnet at each of the forked ends, a rotatable escape wheel made of a magnetic flux conducting material and having an undulating magnetic track disposed between the magnetic poles of both of said permanent magnets so as to magnetically couple the tuning fork and the escape wheel at two circumferentially spaced points on said undulating magnetic track whereby the rotation of the escape wheel is synchronized with the oscillation of the tuning fork.

7. A magnetic escapement mechanism comprising the combination of a rotatable escape wheel made of a magnetic flux conducting material and shaped to provide an undulating magnetic track extending around said escape wheel, a rigid mounting member, and a tuning fork having a base portion rigidly secured to said mounting member and a pair of tines each having polar formations adapted to follow the magnetic track on said escape wheel at two circumferentially spaced points whereby the speed of rotation of the escape wheel is controlled by the frequency of oscillation of the tuning fork and said polar formations thereon.

8. A magnetic escapement mechanism comprising the combination of a rigid mounting member, a tuning fork having a base portion rigidly secured to said mounting member and a pair of oscillatory tines projecting from said base portion, said tuning fork having a permanent magnet mounted on one of said tines and forming a pair of opposed magnetic poles of opposite polarity and defining an open slot extending in the direction of oscillatory movement of the tines, said tuning fork having a weight equivalent to said magnet in moment of inertia attached to the other of said tines, and a rotatable escape wheel made of a magnetic flux conducting material and disposed within said slot for magnetically coupling the tuning fork to the escape wheel, said escape wheel being adapted to modify the reluctance between said opposed magnetic poles in accordance with the predetermined frequency of said tuning fork whereby the rotation of said escape wheel is synchronized with the oscillation of the tuning fork.

References Cited by the Examiner

UNITED STATES PATENTS

| | | | |
|---|---|---|---|
| 1,975,308 | 10/34 | Ashdown | 74—1.5 |
| 2,743,614 | 5/56 | Clifford | 74—1.5 |
| 2,888,582 | 5/59 | Hetzel | 310—25 |

BROUGHTON G. DURHAM, *Primary Examiner.*